(No Model.)
O. T. OWENS.
DRAFT AND LAND GAGE FOR PLOWS, &c.
No. 429,220. Patented June 3, 1890.
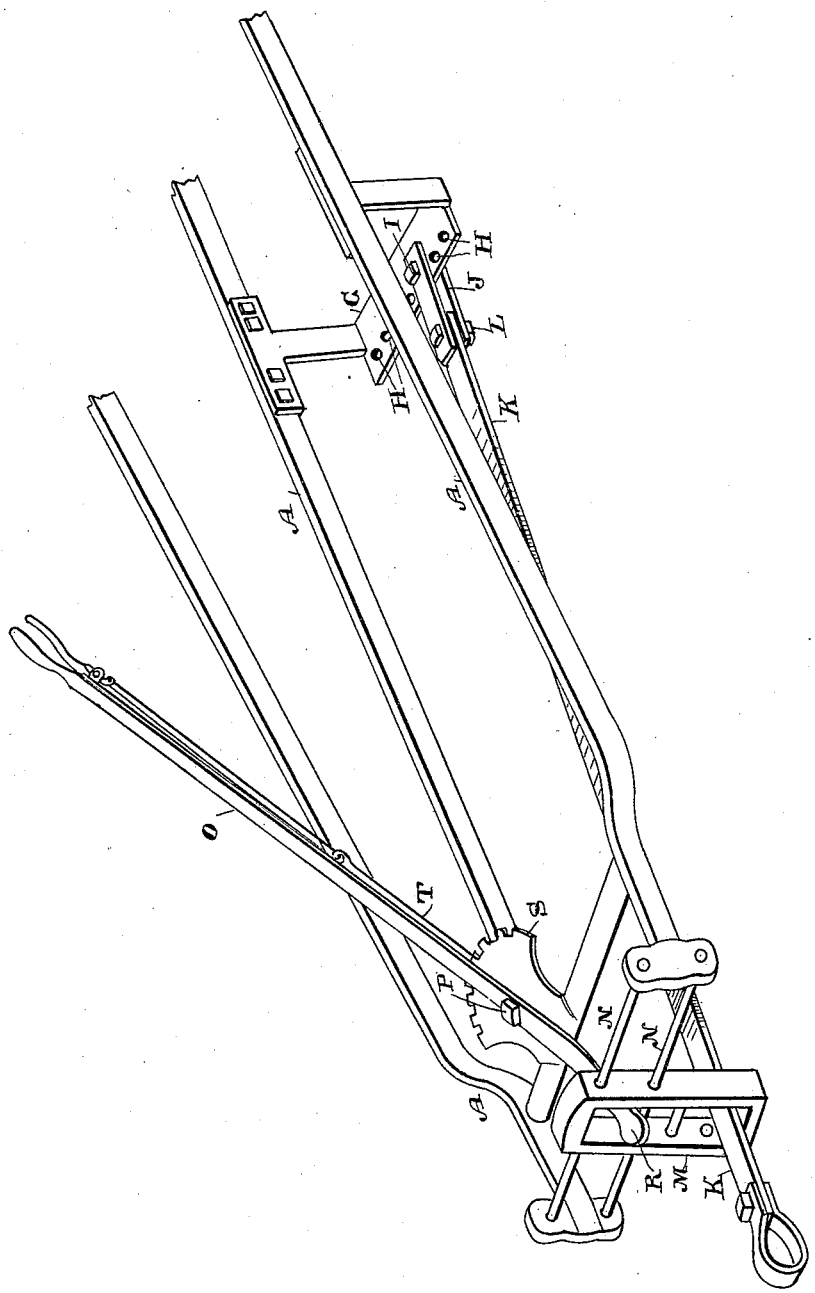
Witnesses,
Geo. H. Strong.
J. H. Nurse
Inventor,
Owen T. Owens
By Dewey & Co.
Atty.

UNITED STATES PATENT OFFICE.

OWEN T. OWENS, OF SAN FRANCISCO, ASSIGNOR TO THE BENICIA AGRICULTURAL WORKS, OF BENICIA, CALIFORNIA.

DRAFT AND LAND GAGE FOR PLOWS, &c.

SPECIFICATION forming part of Letters Patent No. 429,220, dated June 3, 1890.

Application filed March 13, 1890. Serial No. 343,780. (No model.)

*To all whom it may concern:*

Be it known that I, OWEN T. OWENS, a citizen of the United States, residing in the city and county of San Francisco, State of California, have invented an Improvement in Draft and Land Gages for Plows; and I hereby declare the following to be a full, clear, and exact description of the same.

My invention relates to a draft and land gage for gang-plows.

It consists of a draft-bar having its rear end swiveled to a depending yoke beneath the beams to which the plows are attached, a guide through which the front end of the draft-bar passes, and within which it is allowed a vertical movement, horizontal transverse guide-bars upon which this guiding-yoke travels from side to side, a lever by which it is adjusted and a holding-rack, and the means for altering the points of attachment of the rear end of the draft-bar.

Referring to the accompanying drawing for a more complete explanation of my invention, the figure is a view of a gang-plow frame, showing my improvements.

A A are the iron beams composing the frame of a gang-plow having the usual bearing-wheels mounted upon crank-axles, and levers whereby the axles are turned so as to regulate the relative position of these wheels when traveling upon a level surface or when plowing and one wheel is running in the furrow. These devices being old and well known I have not shown them in my present case, and I have also omitted the plows, which are secured to these beams in the usual manner.

Between the bars A of the frame is fixed a bent strap or yoke G, having projections at the top which fit against and are bolted to the frame A. The bottom plate of this yoke is perforated with holes H, adapted to receive a bolt I, which passes through the links J and connects them with the depending yoke G. By means of the holes H this link may be shifted to any point or from one side to the other to change the line of draft.

Between the front ends of the links J the rear end of the draft-bar K is secured by means of a bolt L, which allows it to swivel from side to side in connection with the links J, and also allows the front end of the bar K a certain amount of vertical motion. The front end of the bar K passes through the slotted yoke M, the slot being of sufficient width sidewise to easily admit the width of the draft-bar and having a vertical depth considerably greater than its width, as shown. This yoke has holes bored through its sides near the top and center and the transverse parallel rods M pass through these holes. The ends of these rods are secured by nuts or otherwise in the front ends of the beams A, across which they extend, and the rods are drawn tight by these nuts. The yoke M, being fitted upon these rods, is allowed to move upon them from side to side, as may be desired. The space in the yoke below these rods is sufficient to allow the draft-bar K to have considerable free vertical motion in the yoke to accommodate itself to the varying movements of the team and plows, this movement being quite important.

O is a lever fulcrumed so as to stand at an angle above the frame, and this lever turns about the fulcrum-pin P. The front end R of the lever is rounded, so that it lies between the sides of the yoke M at a point between the guide-bars N, and it will be manifest that when the lever O is moved to one side or the other about its fulcrum the yoke M will be correspondingly moved, traveling upon the guide-bars M, and by this movement, in conjunction with the adjustment of the link J at the rear end of the draft-bar, the draft of the plows may be changed and regulated at will.

S is a rack, and a pawl is mounted upon the lever O, engaging the rack, as shown at T, so as to hold the lever at any desired point of adjustment for the draft. By means of these adjustments and the free vertical movement allowed to the draft-bar within the yoke M the work is very much improved, and the draft upon the horses is made very much lighter.

Having thus described my invention, what I claim as new, and desire to secure by Letters Patent, is—

In a gang-plow, the plow-beams, a downwardly-projecting yoke fixed between the beams at a point behind the wheel-axles and having the horizontal perforated portion, a draft-bar, and links by which the rear end of said bar is connected with either of the holes in the yoke, a guide through which the front end of the draft-bar extends, horizontal transverse parallel rods upon which said guide is movable from side to side, and a lever, pawl, and rack by which the said adjustment is determined, said guide having a vertical slot, within which the front end of the draft-bar has free vertical movement, substantially as herein described.

In witness whereof I have hereunto set my hand.

OWEN T. OWENS.

Witnesses:
S. H. NOURSE,
H. C. LEE.